US012775894B2

(12) United States Patent
Wada et al.

(10) Patent No.: US 12,775,894 B2
(45) Date of Patent: Oct. 27, 2026

(54) CREATION SUPPORT DEVICE, CREATION SUPPORT METHOD, AND CREATION SUPPORT PROGRAM

(71) Applicant: Hitachi, Ltd., Tokyo (JP)

(72) Inventors: Kiyomi Wada, Tokyo (JP); Mineyoshi Masuda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 99 days.

(21) Appl. No.: 18/814,243

(22) Filed: Aug. 23, 2024

(65) Prior Publication Data

US 2025/0252375 A1 Aug. 7, 2025

(30) Foreign Application Priority Data

Feb. 7, 2024 (JP) ................................ 2024-017203

(51) Int. Cl.
*G06Q 10/00* (2026.01)
*G06F 16/3329* (2025.01)
*G06Q 10/0631* (2023.01)

(52) U.S. Cl.
CPC ... *G06Q 10/06316* (2013.01); *G06F 16/3329* (2019.01)

(58) Field of Classification Search
None
See application file for complete search history.

(56) References Cited

U.S. PATENT DOCUMENTS

2004/0136246 A1* 7/2004 Kosuge ................... G06F 8/656 365/200
2020/0159991 A1* 5/2020 Chittari ................. H04L 51/216
2022/0292415 A1 9/2022 Walthers et al.
2022/0398096 A1* 12/2022 Kurihara ................... G06F 8/76
2025/0005020 A1* 1/2025 Thatisetti ............ G06F 16/2455
2025/0069595 A1* 2/2025 Vuskovic ................ G06F 40/35
2025/0106117 A1* 3/2025 Raj ....................... H04L 41/145

OTHER PUBLICATIONS

White, J. (2023). A prompt pattern catalog to enhance prompt engineering with ChatGPT. arXiv preprint arXiv:2302.11382. (Year: 2023).*

* cited by examiner

*Primary Examiner* — Matheus Ribeiro Stivaletti
(74) *Attorney, Agent, or Firm* — PROCOPIO, CORY, HARGREAVES & SAVITCH LLP

(57) ABSTRACT

A creation support device configured to implement generative AI, transmits, to the computer, a creation request of an automation program for automating a procedure of an operation target, receives an answer to the creation request from the computer, transmits, to the computer, a specification request for specifying the operation target and a command for executing the procedure from a program code in the answer to the creation request, receives an answer to the specification request from the computer, transmits, to the computer, a search request of an output result of data acquired from the command in the answer to the specification request, receives an answer to the search request from the computer, generates a re-creation request for re-creating the automation program using the output result in the answer to the search request, transmits the re-creation request to the computer, and receives an answer to the re-creation request from the computer.

20 Claims, 13 Drawing Sheets

[FIG. 1]
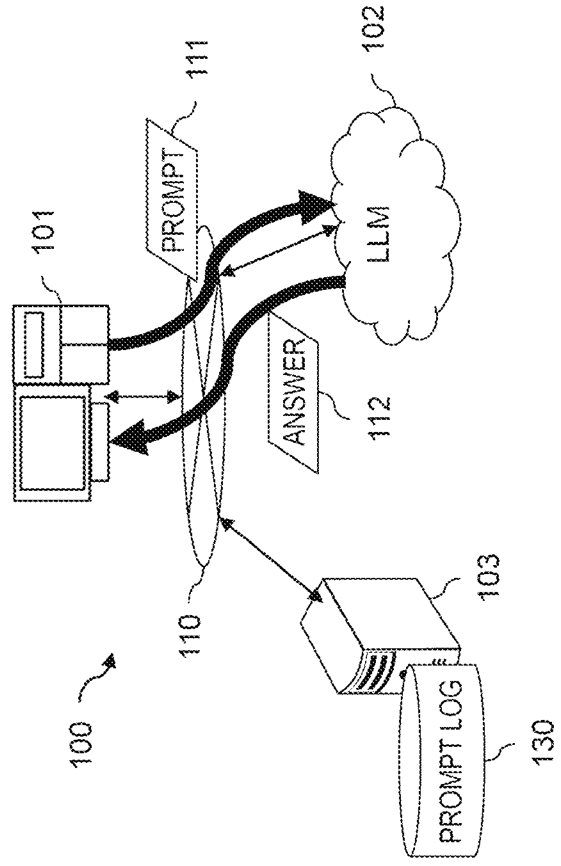

[FIG. 2]
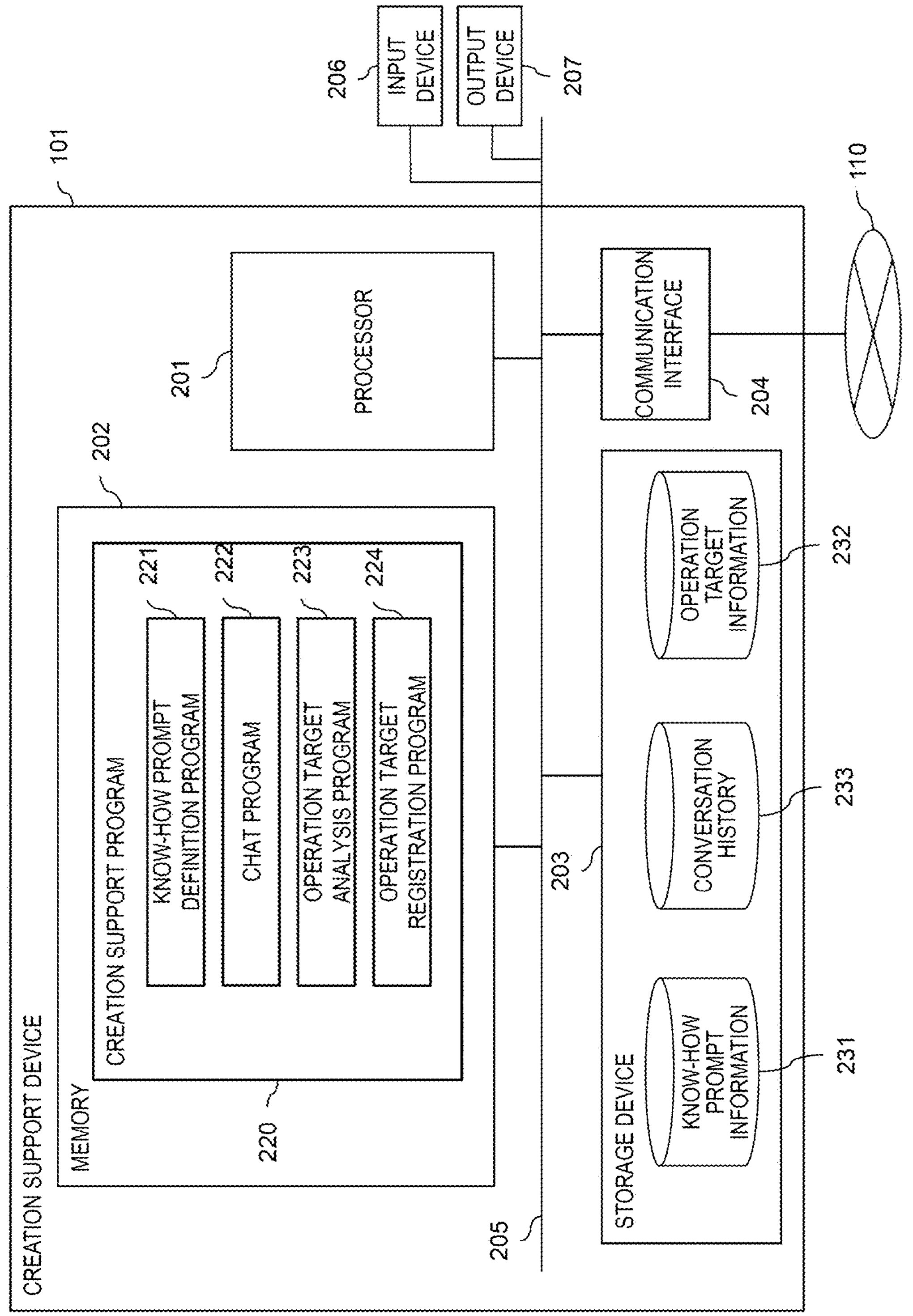

[FIG. 3]
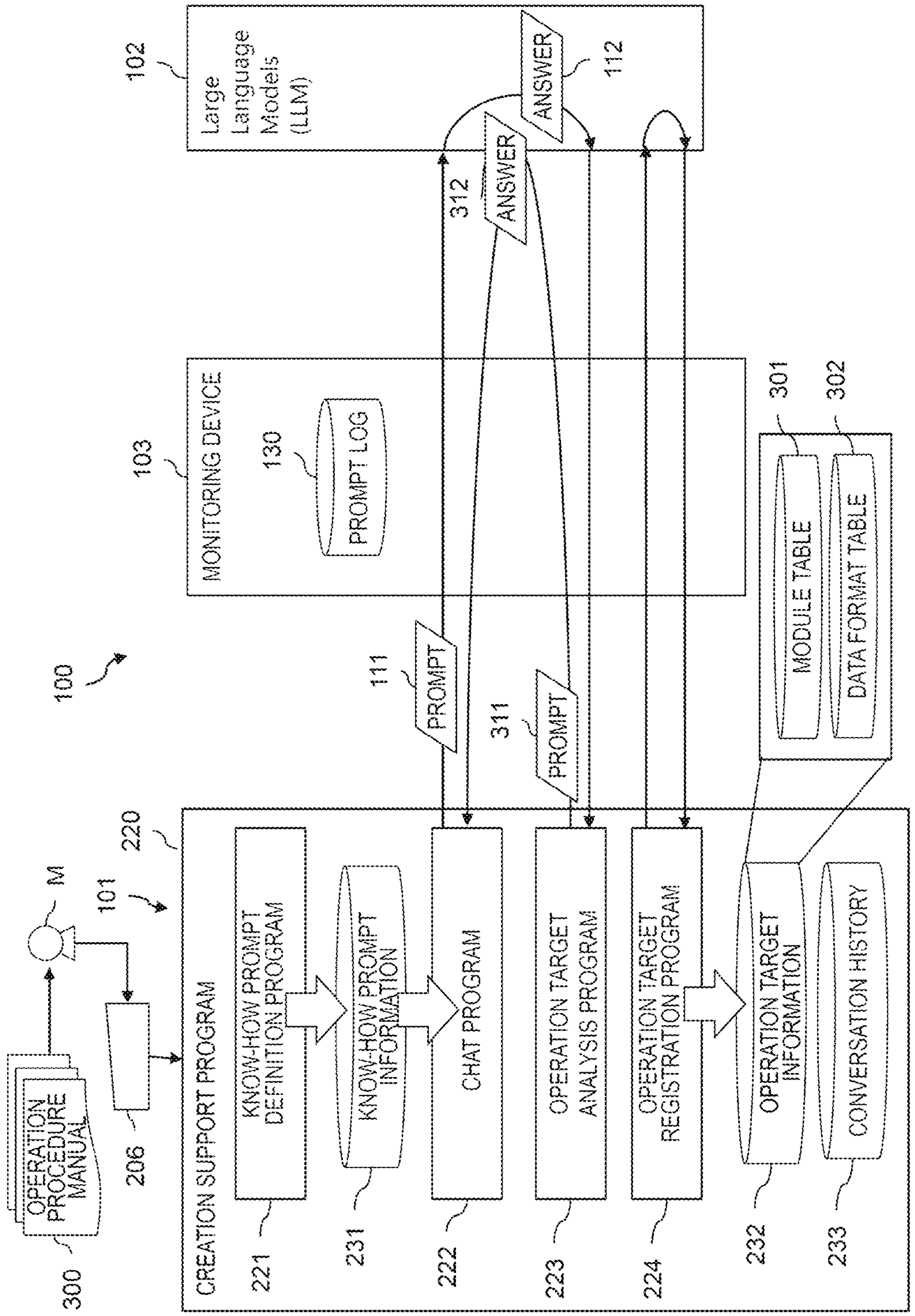

[FIG. 4]
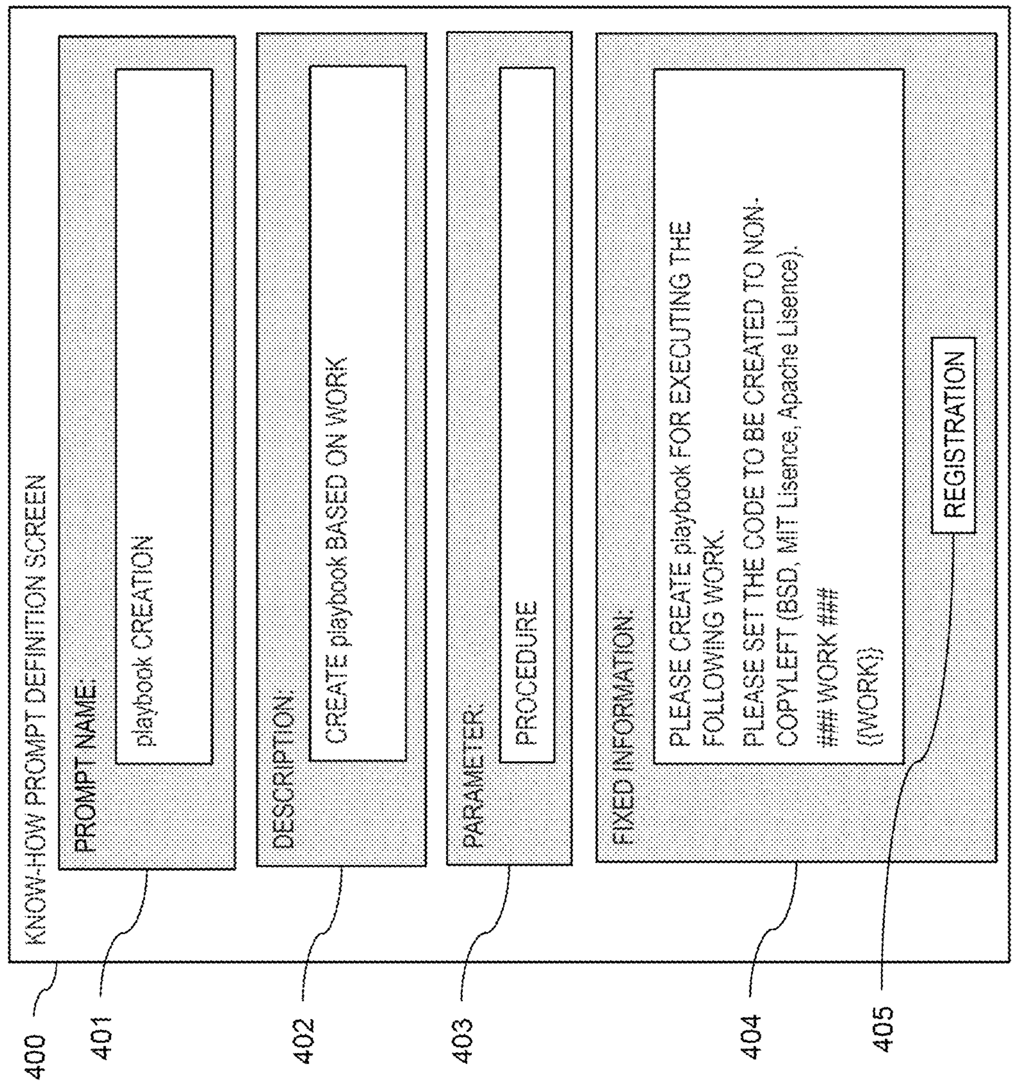

[FIG. 5]
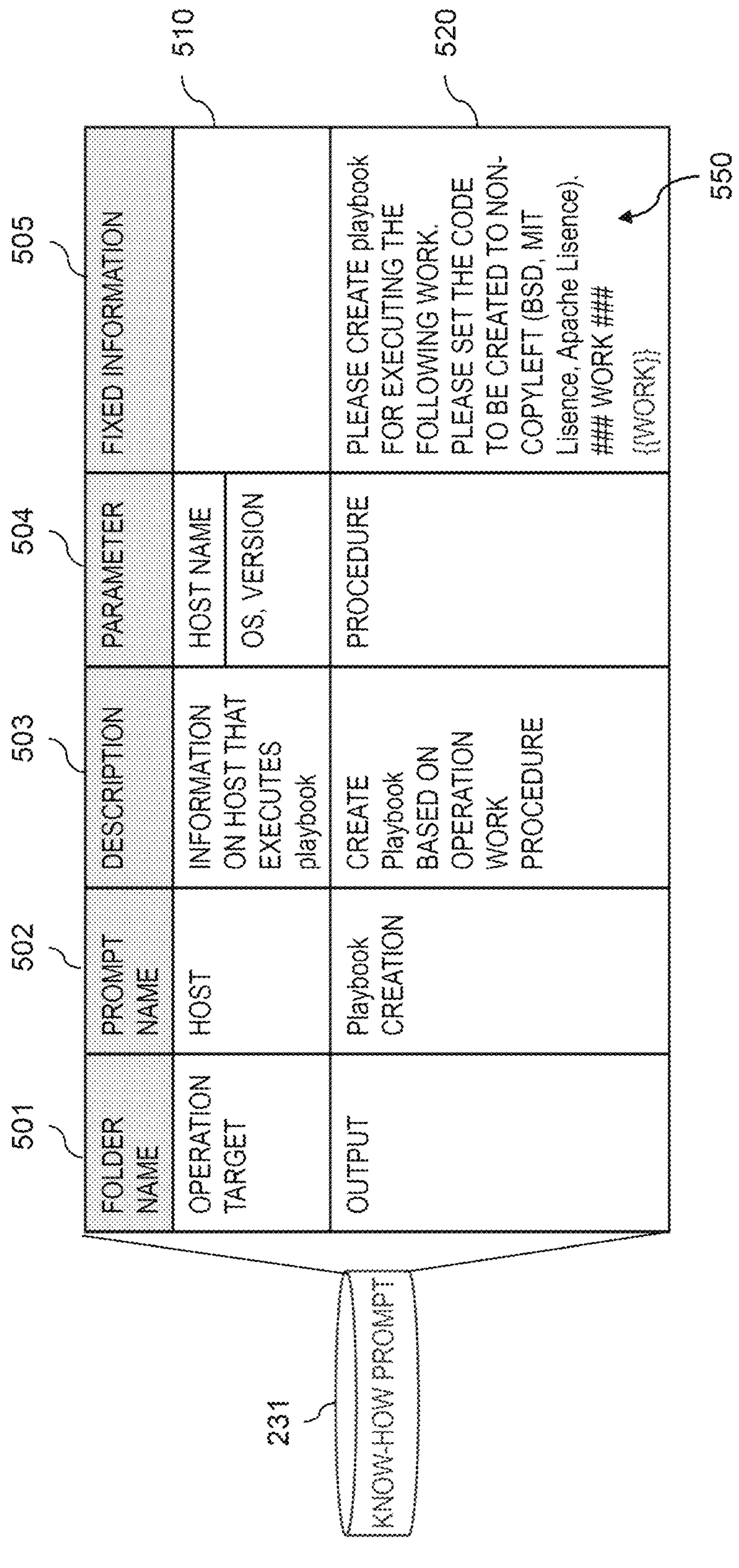

[FIG. 6]
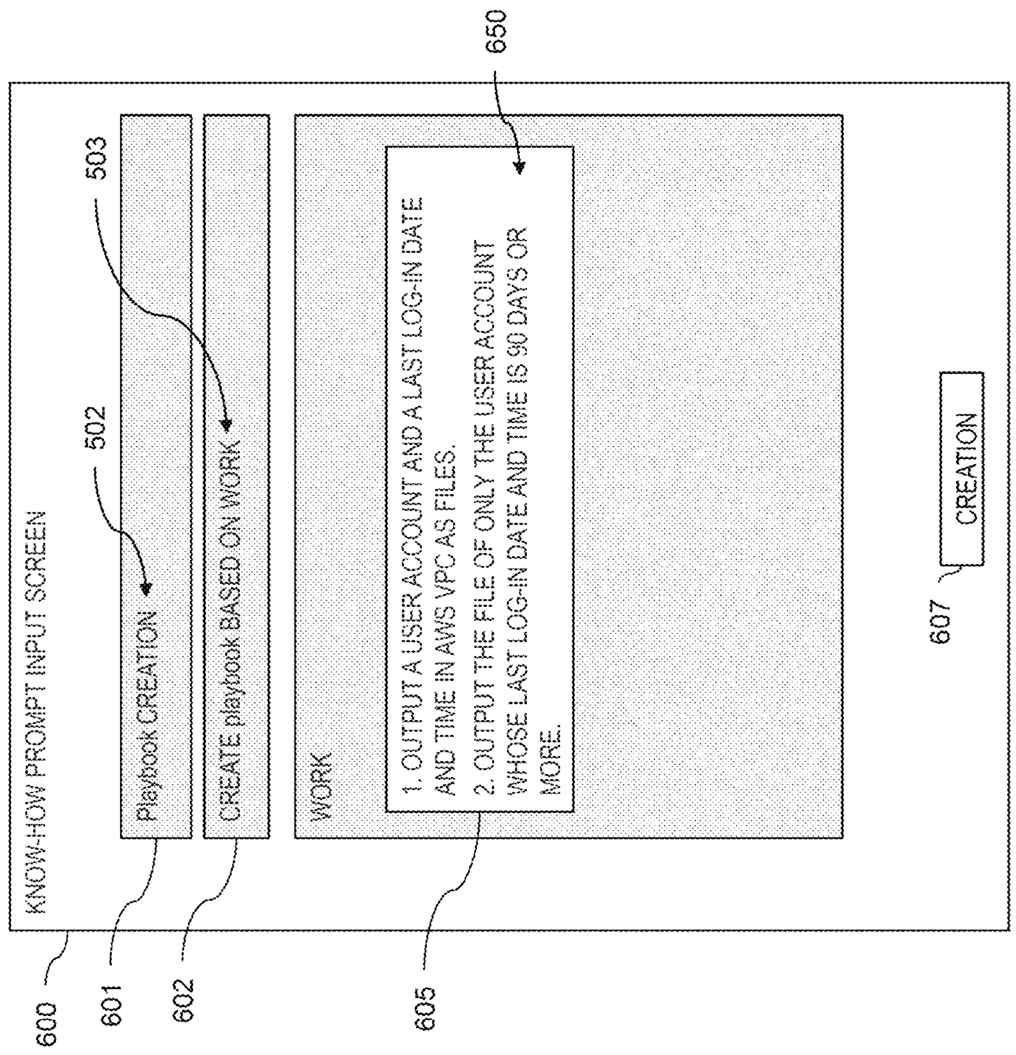

[FIG. 7]
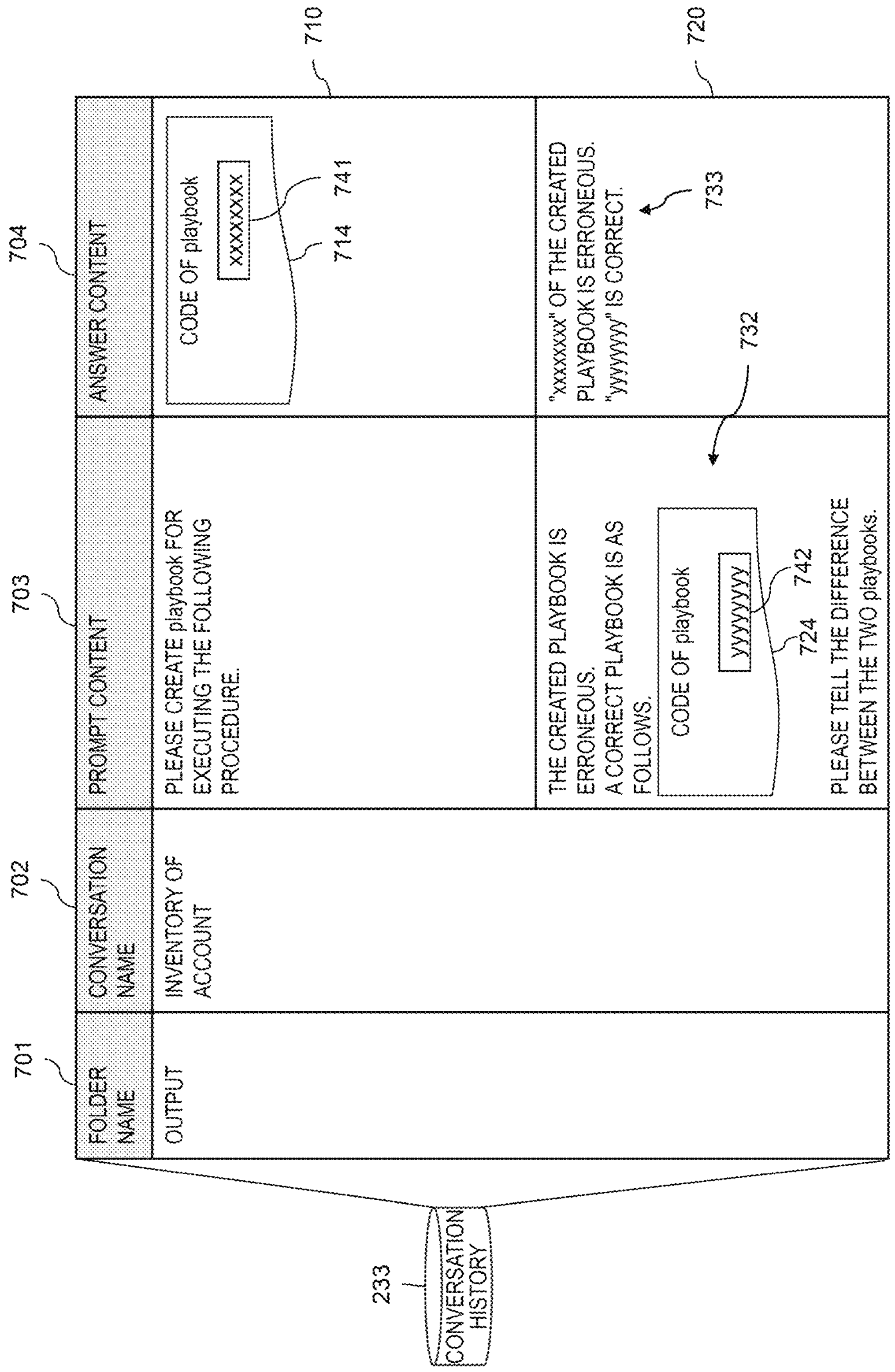

[FIG. 8]

130 PROMPT LOG

| FOLDER NAME (701) | CONVERSATION NAME (702) | MESSAGE ID (803) | MESSAGE (804) | TIME (805) |
| --- | --- | --- | --- | --- |
| OUTPUT | INVENTORY OF ACCOUNT | 0 | {"role":"system","content":"•••"} | yyyymmddThhmmss+\|-hhmm |
| | | 1 | {"role":"user","content":"•••"} | |
| | | 2 | {"role":"assistant","content":"•••"} | |

[FIG. 9]
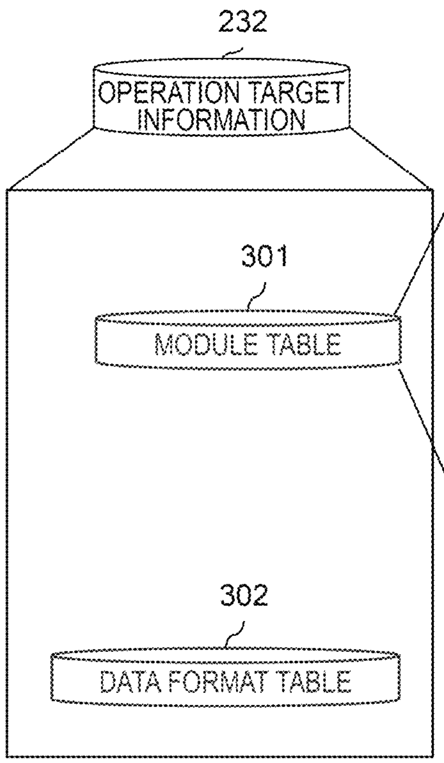
901 902 903
| OPERATION TARGET | MODULE NAME | CONVERSION RULE |
|---|---|---|
| AWS | EC2 | community. aws. ec2: MODULE IS USED, BUT THIS IS NOT A CORRECT MODULE NAME. CORRECT ec2: IS USED. A PARAMETER id: IS USED, BUT THIS PARAMETER IS NOT PRESENT. WHEN THE AMI ID IS DESIGNATED, image: IS USED. |
| ... | ... | ... |

[FIG. 10]
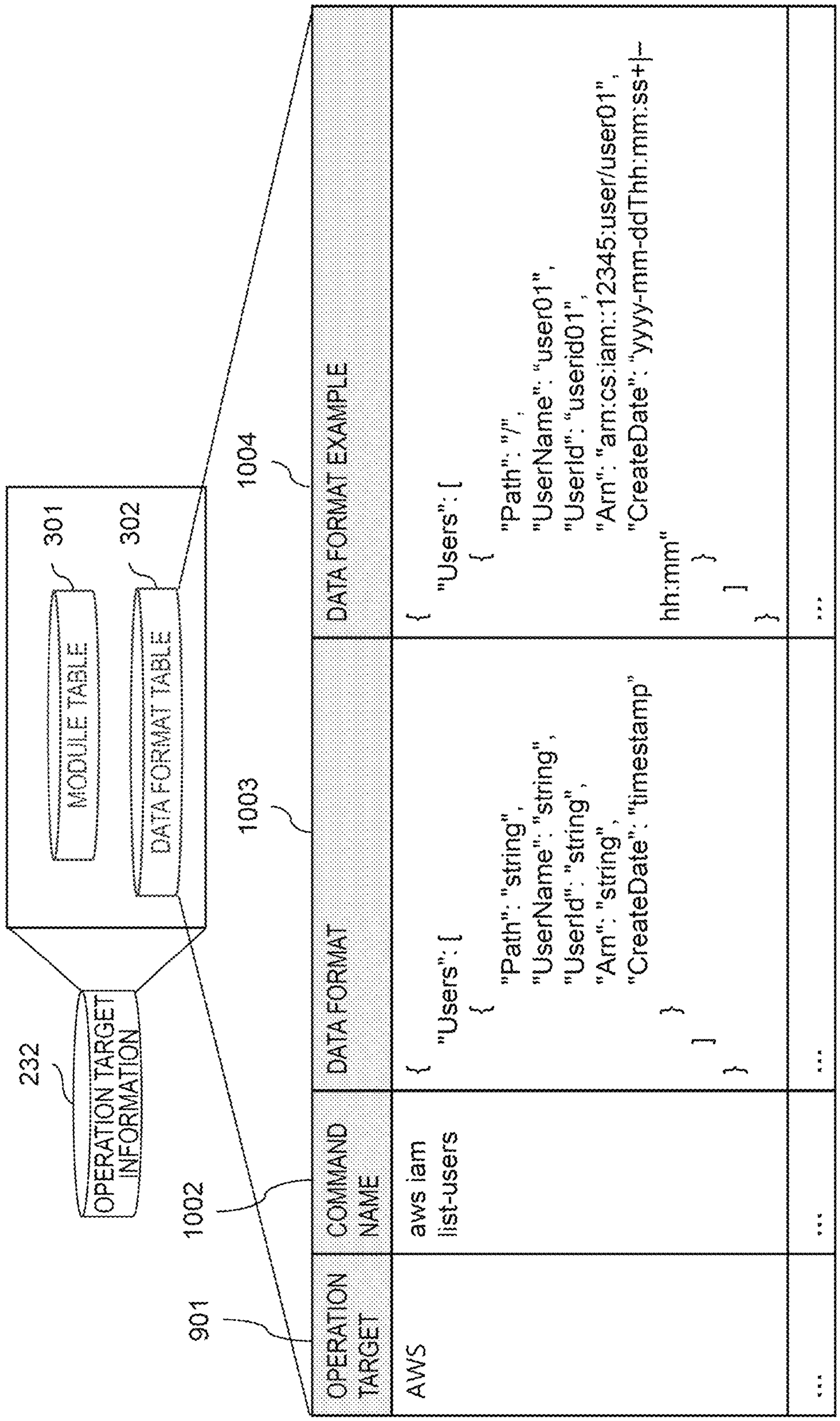

[FIG. 11]
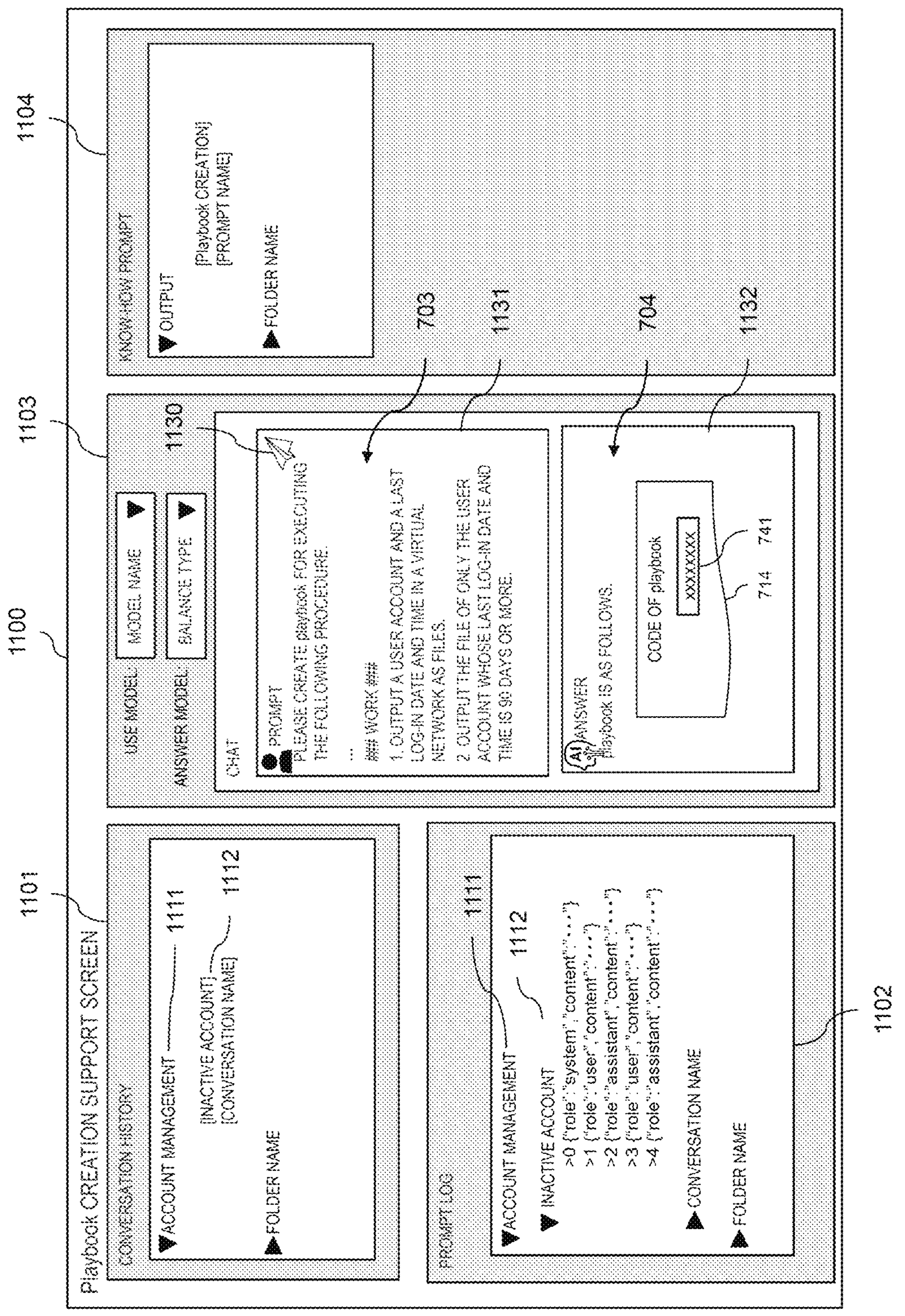

[FIG. 12]
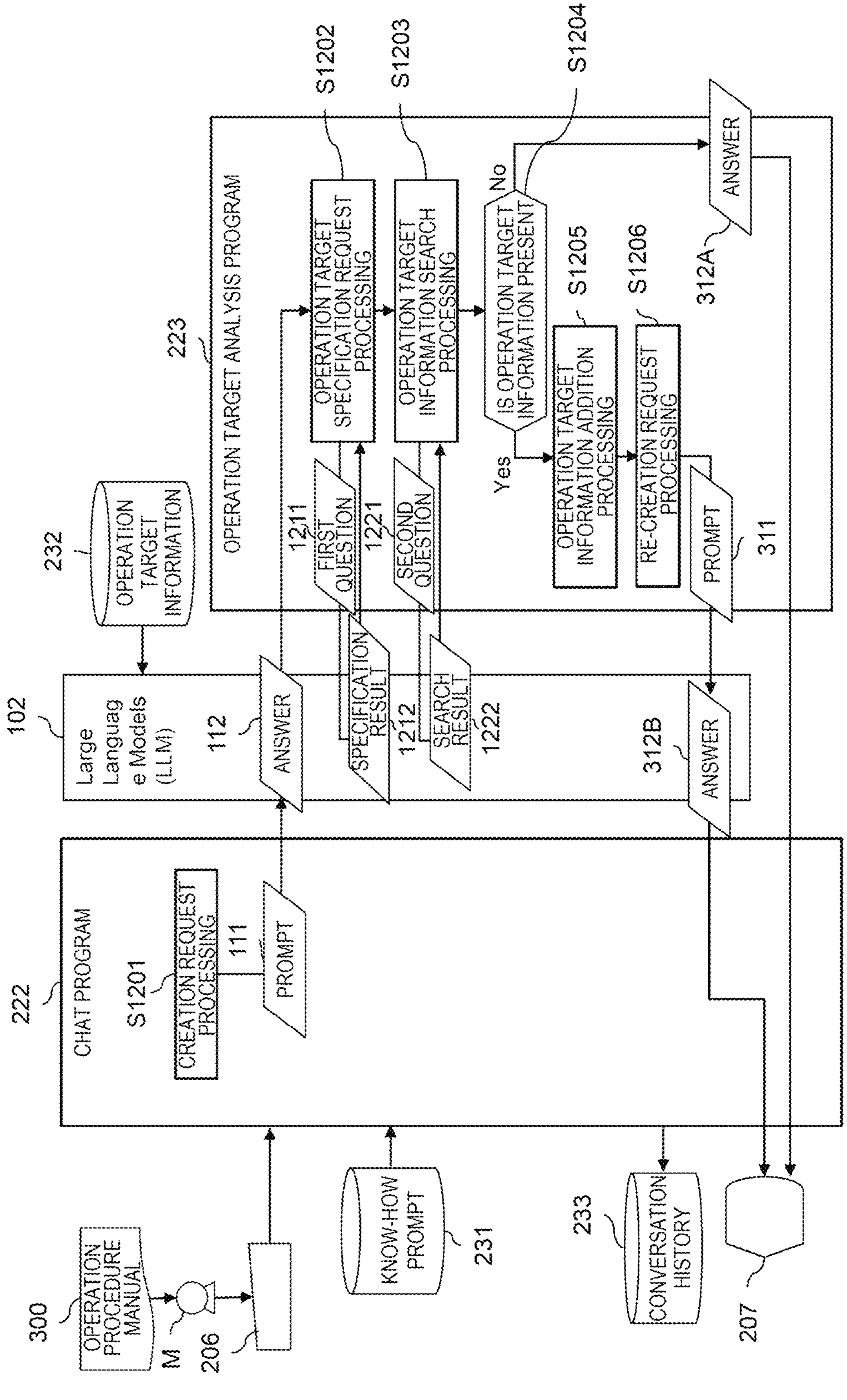

[FIG. 13]
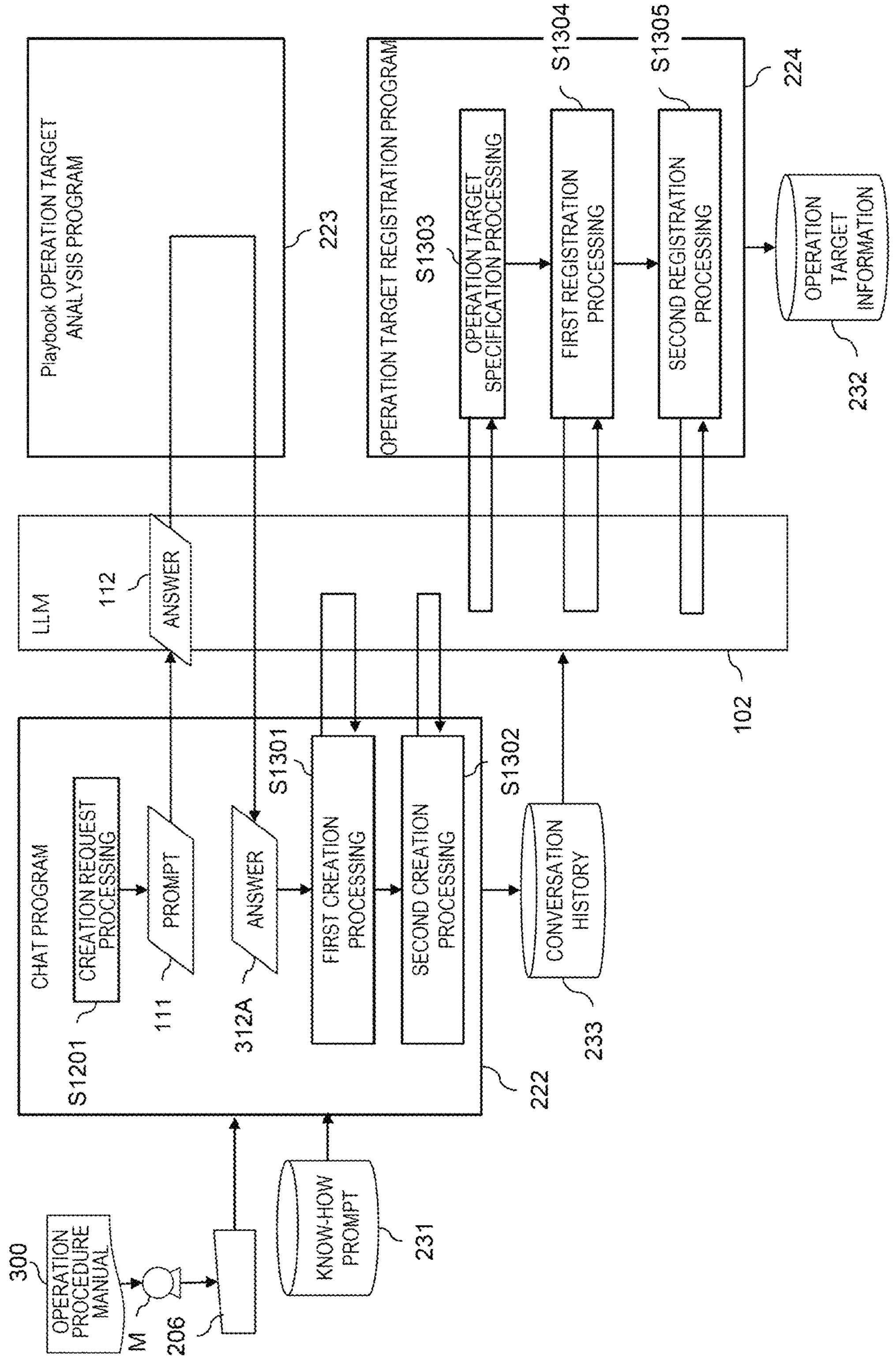

CREATION SUPPORT DEVICE, CREATION SUPPORT METHOD, AND CREATION SUPPORT PROGRAM

CLAIM OF PRIORITY

The present application claims priority from Japanese patent application No. 2024-17203, filed on Feb. 7, 2024, the content of which is hereby incorporated by reference into this application.

TECHNICAL FIELD

The present invention relates to a creation support device for supporting creation of data, a creation support method, and a creation support program.

BACKGROUND ART

In cloud operation based on a site reliability engineering (SRE), operation automation has been promoted in order to ensure agility (flexibility in which software constituting a cloud or a development method thereof can be quickly adapted to a request of a customer or a change in a business environment), reliability, and stability. Therefore, in order to support program development for automating manual operation work by an operation manager, generative artificial intelligence (AI) is used. However, in order to develop a program by using the generative AI, skills of prompt engineering are required.

PTL 1 below discloses automatic generation of a playbook. The automatic generation of the playbook includes: a step of determining a set of estimation steps from a target set of incident reports; a step of determining a set of playbook steps by identifying a set of clusters in the set of the estimation steps, a playbook step in the set of the playbook steps corresponding to a cluster in the identified set of the clusters, the cluster in the identified set of the clusters including at least one estimation step in the set of the estimation steps; a step of determining a sequence of the set of the playbook steps based on an order of the estimation steps in the target set of the incident reports and a correspondence relationship between the estimation step and the identified set of the clusters; and a step of displaying an instruction of the set of the playbook steps on a user interface according to the determined sequence of the set of the playbook steps.

CITATION LIST

Patent Literature

PTL 1: US2022/0292415

SUMMARY OF INVENTION

Technical Problem

In the above-described PTL 1, in response to an incident, if there is a similar event occurred in the past, a countermeasure process and automation possibility are presented to a user. Accordingly, PTL 1 does not consider an unknown problem.

An object of the invention is to reduce a prompt input load of manpower and improve accuracy of a created automation program.

Solution to Problem

A creation support device according to one aspect of the invention disclosed in the present application includes: a processor configured to execute a program; a storage device configured to store the program; and a communication interface configured to communicate with a computer trained to generate an answer to an inquiry. The processor executes: creation request processing of transmitting, to the computer, a creation request of an automation program for automating a work procedure of an operation target, and receiving an answer to the creation request from the computer; specification request processing of transmitting, to the computer, a specification request for specifying the operation target and a command for executing the work procedure from a program code included in the answer to the creation request, and receiving an answer to the specification request from the computer; search request processing of transmitting, to the computer, a search request of an output result of data acquired from the command included in the answer to the specification request, and receiving an answer to the search request from the computer; generation processing of generating a re-creation request for re-creating the automation program using the output result included in the answer to the search request; and re-creation request processing of transmitting the re-creation request generated by the generation processing to the computer, and receiving an answer to the re-creation request from the computer.

Advantageous Effects of Invention

According to a representative embodiment of the invention, it is possible to reduce a prompt input load of manpower and improve accuracy of a created automation program. Problems, configurations, and effects other than those described above will be clarified by descriptions of the following embodiments.

BRIEF DESCRIPTION OF DRAWINGS

FIG. 1 is a diagram showing a system configuration example of a network system.

FIG. 2 is a block diagram showing a hardware structure example of a creation support device.

FIG. 3 is a diagram showing an operation example of the network system.

FIG. 4 is a diagram showing an example of a know-how prompt definition screen.

FIG. 5 is a diagram showing an example of know-how prompt information.

FIG. 6 is a diagram showing an example of a know-how prompt input screen.

FIG. 7 is a diagram showing an example of a conversation history.

FIG. 8 is a diagram showing an example of a prompt log.

FIG. 9 is a diagram showing an example of a module table.

FIG. 10 is a diagram showing an example of a data format table.

FIG. 11 is a diagram showing an example of a creation support screen.

FIG. 12 is a flowchart showing an example of operation target analysis processing performed by an operation target analysis program.

FIG. 13 is a flowchart showing an example of operation target registration processing performed by an operation target registration program.

DESCRIPTION OF EMBODIMENTS

In the following description, each processing in the embodiment of the invention may be described with a "program" as a subject (operation subject). Since the program performs processing determined by being executed by a processor using a memory and a communication interface, the description may be made with the processor as the subject. The processing disclosed by using the program as the subject may be performed by a computer. A part or all of the program may be implemented by dedicated hardware and may be modularized. Various programs may be installed in the computer based on a program distribution server or storage media.

<FIG. 1 System Configuration Example of Network System>

FIG. 1 is a diagram showing a system configuration example of a network system. A network system 100 includes a creation support device 101, a large language model (LLM) 102, and a monitoring device 103. The creation support device 101, the LLM 102, and the monitoring device 103 are communicably connected via a network 110 such as the Internet, a local area network (LAN), or a wide area network (WAN).

The creation support device 101 supports creation of an automation program. The automation program is a program for automating a procedure of operation work of an operation target. The automation program is also called a playbook. In the embodiment, the automation program may be referred to as a playbook. The operation target is middleware and various cloud services such as a server (OS) to be executed by the automation program, a network, a storage, and a DB.

The creation support device 101 creates a prompt 111 and transmits the prompt 111 to the LLM 102. The prompt 111 includes various inquiries such as a creation request for the automation program to the LLM 102 and a question to the LLM 102.

The LLM 102 is an interactive generative AI trained to generate an answer to an inquiry. When an inquiry such as the prompt 111 is input, the LLM 102 generates an answer 112 and transmits the answer 112 to the creation support device 101. The LLM 102 is implemented, for example, on a computer (not shown) in the network 110. The LLM 102 may be implemented on the creation support device 101 or the monitoring device 103.

Accuracy of the answer 112 from the LLM 102 depends on training accuracy of the LLM 102. Accordingly, in a case where the LLM 102 is trained with an untrained content or information that has been trained but is old, there may be an error in the answer 112 to the prompt 111. The LLM 102 continues to be trained based on interaction with the creation support device 101 and a computer other than the creation support device 101.

The monitoring device 103 monitors communication between the creation support device 101 and the LLM 102 by an application programming interface (API), and generates a prompt log 130 as a monitoring result. The prompt log 130 is data in which messages and times in the prompt 111 are recorded.

<FIG. 2 Hardware Structure Example of Creation Support Device 101>

FIG. 2 is a block diagram showing a hardware structure example of the creation support device 101. The creation support device 101 includes a processor 201, a memory 202, a storage device 203, a communication interface 204, and a bus 205.

The processor 201 controls the creation support device 101. The memory 202 stores a creation support program 220. The memory 202 serves as a work area of the processor 201. The creation support program 220 is loaded from the storage device 203 into the memory 202. The creation support program 220 includes a know-how prompt definition program 221, a chat program 222, an operation target analysis program 223, and an operation target registration program 224.

The know-how prompt definition program 221 is a program for defining know-how prompt information 231. The chat program 222 is a program for interacting with the LLM 102. The operation target analysis program 223 is a program for analyzing the operation target. The operation target registration program 224 is a program for registering the operation target.

The storage device 203 stores the know-how prompt information 231, a conversation history 233, and operation target information 232. The know-how prompt information 231 is information that defines the prompt 111. The know-how prompt information 231 is registered in the storage device 203 by the know-how prompt definition program 221. The know-how prompt information 231 will be described later in detail with reference to FIG. 4.

The conversation history 233 is information in which a character string, that is, a conversation history transmitted and received between the creation support program 220 and the LLM 102 is recorded. The conversation history 233 is registered in the storage device 203 by the chat program 222. The operation target information 232 is information related to the operation target. The operation target information 232 is registered in the storage device 203 by the operation target registration program 224.

The operation target information 232 includes, for example, a name of a command (command name) to be input to the operation target in order to execute a work procedure, a format of output data (hereinafter referred to as a data format) output from the operation target according to the input of the command, and a data format example. The data format and the data format example are collectively referred to as an "output result".

The operation target information 232 includes, for example, a conversion rule for a module to be created in the operation target. When the name of the module (module name) is changed, the conversion rule is, for example, definition information for converting a module name before change to a module name after change.

When the LLM 102 does not learn the operation target information 232, the LLM 102 may return the output result with an error and the module name before the change as the answer 112.

Examples of the memory 202 and the storage device 203 include a read only memory (ROM), a random access memory (RAM), a hard disk drive (HDD), and a flash memory. The memory 202 and the storage device 203 are collectively referred to as a storage device.

The communication interface 204 is connected to the network 110, and transmits and receives data.

The bus 205 communicably connects the processor 201, the memory 202, the storage device 203, and the communication interface 204.

The creation support device 101 is connected to an input device 206 and an output device 207 via the bus 205. The input device 206 inputs data. Examples of the input device 206 include a keyboard, a mouse, a touch panel, a numeric keypad, a scanner, a microphone, and a sensor. The output device 207 outputs data. Examples of the output device 207 include a display, a printer, and a speaker.

<FIG. 3 Operation Example of Network System 100>

FIG. 3 is a diagram showing an operation example of the network system 100. An operation manager M creates the know-how prompt information 231 by the know-how prompt definition program 221 by referring to an operation procedure manual 300. Here, the know-how prompt information 231 will be specifically described.

[Creation Example of Know-how Prompt Information 231]

<FIG. 4 Know-how Prompt Definition Screen>

FIG. 4 is a diagram showing an example of a know-how prompt definition screen. A know-how prompt definition screen 400 is called by the know-how prompt definition program 221, is displayed on a display screen of the output device 207, and is input to the input device 206 in text. The know-how prompt definition screen 400 includes a prompt name input region 401, a description input region 402, a parameter input region 403, a fixed information input region 404, and a registration button 405.

The prompt name input region 401, the description input region 402, the parameter input region 403, and the fixed information input region 404 are regions for receiving the inputs of the character strings. The registration button 405 is a user interface for registering, as know-how prompts, the character strings input to the prompt name input region 401, the description input region 402, the parameter input region 403, and the fixed information input region 404.

<FIG. 5 Know-how Prompt Information 231>

FIG. 5 is a diagram showing an example of the know-how prompt information 231. The know-how prompt information 231 is a table that defines a know-how prompt by the know-how prompt definition program 221. The know-how prompt information 231 includes a folder name 501, a prompt name 502, a description 503, a parameter 504, and fixed information 505 as fields. A combination of values of fields in the same row defines one know-how prompt. In FIG. 5, two know-how prompts 510 and 520 are registered.

The folder name 501 is a character string indicating a name of a folder in which the know-how prompt is stored. The prompt name 502 is a character string indicating a name of the know-how prompt. The description 503 is a character string illustrating the know-how prompt. The parameter 504 is a numerical value indicating a variable related to the prompt name 502 or a character string. The fixed information 505 is a character string fixed in the know-how prompt. In the know-how prompt 520, a character string 550 is registered as the fixed information 505.

When the registration button 405 is pressed by an operation input of the input device 206, the character string input to the prompt name input region 401 is registered as the prompt name 502. When the registration button 405 is pressed by the operation input of the input device 206, the character string input to the description input region 402 is registered as the description 503. When the registration button 405 is pressed by the operation input of the input device 206, the character string input to the parameter input region 403 is registered as the parameter 504. When the registration button 405 is pressed by the operation input of the input device 206, the character string input to the fixed information input region 404 is registered as the fixed information 505.

<FIG. 6 Know-how Prompt Input Screen>

FIG. 6 is a diagram showing an example of a know-how prompt input screen. A know-how prompt input screen 600 is called by designating the know-how prompt information 231 by the chat program 222, is displayed on the display screen of the output device 207, and is input to the input device 206 in text. FIG. 6 shows a state in which the know-how prompt 520 is called.

The know-how prompt input screen 600 includes a prompt name display region 601, a description display region 602, a work input region 605, and a creation button 607.

The prompt name display region 601 displays the prompt name 502. The description display region 602 displays the description 503. The work input region 605 is a region for receiving an input of a specific work procedure to be requested by the LLM 102 as additional information to be added to the fixed information 505. The creation button 607 is a user interface for creating the prompt 111.

When the creation button 607 is pressed by the operation input of the input device 206, the prompt 111 is created based on a character string 650 indicating the work procedure input to the work input region 605 as the additional information.

Returning to FIG. 3. The chat program 222 transmits the prompt 111 to the LLM 102 via the network 110. The monitoring device 103 acquires the prompt 111 and records the prompt 111 in the prompt log 130.

The LLM 102 generates the answer 112 for the prompt 111, and transmits the answer 112 to the creation support device 101. The answer 112 may be a code of an automation program created in an old version, or may be a code of an automation program created in an erroneous data format.

The LLM 102 cannot answer the untrained content. Since a version and a data format of the operation target depend on a target to which the operation target is applied, the LLM 102 is not necessarily comprehensively trained. Accordingly, the accuracy of the answer 112 depends on the training accuracy of the LLM 102.

In the creation support device 101, the operation target analysis program 223 receives the answer 112, analyzes the operation target by referring to the answer 112, creates a prompt 311 for the answer 112, and transmits the prompt 311 to the LLM 102 via the network 110.

The LLM 102 generates an answer 312 for the prompt 311, and outputs the answer 312 to the chat program 222. A content of the answer 312 depends on the presence or absence of the operation target in the answer 112. Details of the answer 312 will be described later. The chat program 222 outputs the answer 312 to the output device 207.

The operation target registration program 224 generates the operation target information 232 by referring to the prompt log 130. The operation target information 232 includes a module table 301 and a data format table 302. The conversation between the chat program 222 and the LLM 102 is registered in the conversation history 233.

<FIG. 7 Conversation History 233>

FIG. 7 is a diagram showing an example of the conversation history 233. The conversation history 233 includes a folder name 701, a conversation name 702, a prompt content 703, and an answer content 704 as fields.

The folder name 701 is a name of a folder in which the conversation history 233 is stored. The conversation name 702 is a name of a conversation stored in the folder of the folder name 701. The folder name 701 and the conversation name 702 are embedded in the prompt 111. The prompt content 703 is a content of the prompt 111. In a case of an entry 710 on the first row, the prompt content 703 is a character string including the character string 550 of the fixed information 505 and the character string 650 of the additional information shown in FIG. 6.

The answer content 704 is a content of the answer 112. In the case of the entry 710, the answer content 704 is, for example, a code 714 of the playbook.

An entry 720 on the second row indicates the prompt content 703 and the answer content 704 when the chat program 222 transmits the prompt 111 to the LLM 102 again and the LLM 102 answers again to the answer content 704 of the entry 710 on the first row based on the input of the operation manager M.

The operation manager M views the answer content 704 of the entry 710 on the first row from the LLM 102 and finds an erroneous description 741 in the code 714 of the playbook indicated by the answer content 704. In this case, the operation manager M inputs that "the created playbook is erroneous. A correct playbook is as follows.", attaches a code 724 of the correct playbook, and inputs that "please tell the difference between the two playbooks.". The chat program 222 transmits an input character string 732 (including the code 724 of the correct playbook) to the LLM 102 as a new prompt 111.

In this case, the LLM 102 generates a character string 733 as the answer content 704. The character string 733 indicates a difference between the code 714 of the playbook and the correct code 724 of the correct playbook, such as ""xxxxxxxx" of the created playbook is erroneous. "yyyyyyyy" is correct.". That is, a correspondence relationship between the erroneous description 741 in the code 714 of the playbook and a correct description 742 in the code 724 of the correct playbook is known. Such a correspondence relationship is stored in the module table 301 as a conversion rule 903.

<FIG. 8 Prompt Log 130>

FIG. 8 is a diagram showing an example of the prompt log 130. The prompt log 130 includes the folder name 701, the conversation name 702, a message ID 803, a message 804, and a time 805 as fields.

The message ID 803 is an identification number that uniquely specifies the message 804. The message ID 803 is an integer in ascending order starting from, for example, 0. The message 804 is a combination of "role" and "content" specified by the message ID 803. "role" indicates a sender, and "content" indicates a transmission content. The time 805 is a time stamp at which the message 804 is transmitted.

In the message 804, the message 804 in which "role" is "system" indicates the entire definition. "user" of "role" indicates a user of the chat program 222, that is, the operation manager M. Accordingly, the message 804 in which "role" is "user" is the prompt 111, and the "content" is the prompt content 703.

On the other hand, "assistant" of "role" indicates the LLM 102. Accordingly, the message 804 in which "role" is "assistant" is the answers 112 and 312, and the "content" is the answer content 704.

<Operation Target Information 232>

Next, the operation target information 232 will be described. The operation target information 232 includes the module table 301 and the data format table 302.

[FIG. 9 Module Table 301]

FIG. 9 is a diagram showing an example of the module table 301. The module table 301 includes an operation target 901, a module name 902, and the conversion rule 903 as fields.

The operation target 901 is a service operated by a playbook which is an automation program, or is a system for operating the service. "AWS" is a name of the operation target 901 (operation target name). The module name 902 is a name of a module in the operation target 901. The conversion rule 903 indicates a correspondence relationship between the playbooks before and after conversion specified by the interaction between the chat program 222 and the LLM 102.

[FIG. 10 Data Format Table 302]

FIG. 10 is a diagram showing an example of the data format table 302. The data format table 302 includes the operation target 901, a command name 1002, a data format 1003, and a data format example 1004 as fields.

The command name 1002 is a name of a command for acquiring data from the operation target 901. The data format 1003 is an output result when a command of the command name 1002 is input to the operation target 901. The data format example 1004 is an example of the data format 1003.

The operation target information 232 is stored in the creation support device 101, and can be accessed by the LLM 102. The operation target information 232 may be stored in a computer other than the creation support device 101 as long as the operation target information 232 can be accessed by the LLM 102. In this case, when the operation target information 232 is updated in the creation support device 101, the operation target information 232 stored in another computer is also updated in synchronization with the update.

When the LLM 102 accesses the operation target information 232, specifically, for example, the LLM 102 can learn contents of, for example, what is present in the operation target 901, what is the module name 902 of the module used in the operation target 901, what is the module name 902 before and after conversion in the operation target 901, what is the command name 1002 of the command for acquiring the data in the operation target 901, and what is the format of the output result (the data format 1003 or the data format example 1004) of the operation target 901 according to the command.

Accordingly, when the command of the command name 1002 is given, the LLM 102 can create an automation program in which data is converted according to the data format 1003 or the data format example 1004. The LLM 102 can create the automation program in which the module name 902 is converted according to the conversion rule 903.

<Creation Support Screen>

FIG. 11 is a diagram showing an example of a creation support screen. A creation support screen 1100 is displayed on the output device 207. The creation support screen 1100 includes a conversation history display region 1101, a prompt log display region 1102, a chat display region 1103, and a know-how prompt display region 1104.

The conversation history display region 1101 is a region for displaying the conversation history 233. When account management 1111 as the folder name 701 is expanded, an inactive account 1112 as the conversation name 702 is displayed.

The prompt log display region 1102 is a region for displaying the prompt log 130. When the account management 1111 as the folder name 701 is expanded, the inactive account 1112 as the conversation name 702 is displayed. When the inactive account 1112 is expanded, the message 804 of the prompt log 130 is displayed.

Since the conversation history 233 and the prompt log 130 are stored in the same folder (folder name 701: account management 1111), it is possible to associate the conversation history 233 and prompt log 130.

The chat display region 1103 is capable of selecting a use model and an answer type of the LLM 102, and includes a prompt content display region 1131 and an answer content display region 1132. The prompt content display region 1131 is a region for inputting and displaying the prompt content 703. The answer content display region 1132 is a region for displaying the answer content 704. When a transmit button 1130 is pressed, the prompt 111 of the prompt content 703 is transmitted to the LLM 102. When the answer 112 is received from the LLM 102, the answer content 704 is displayed. The know-how prompt display region 1104 is a region for displaying the know-how prompt information 231.

<FIG. 12 Operation Target Analysis Processing>

FIG. 12 is a flowchart showing an example of operation target analysis processing performed by the operation target analysis program 223.

The operation manager M refers to the operation procedure manual 300, divides the operation work into steps such as "1. Output a user account and a last log-in date and time in a virtual network as files. 2. Output the file of only the user account whose last log-in date and time is 90 days or more.", and creates the prompt 111 using the know-how prompt information 231. Specifically, for example, the prompt content 703 is written into the prompt content display region 1131.

(Step S1201: Creation Request Processing)

As creation request processing, the chat program 222 transmits the prompt 111 to the LLM 102. Specifically, for example, when the pressing of the transmit button 1130 is detected, the chat program 222 transmits the prompt 111 including the prompt content 703 to the LLM 102. When the prompt 111 is received from the chat program 222, the LLM 102 generates the answer 112 to the prompt 111 and transmits the answer 112 to the operation target analysis program 223.

(Step S1202: Operation Target Specification Request Processing)

When the answer 112 is received from the LLM 102, the operation target analysis program 223 executes operation target specification request processing. In the operation target specification request processing, the operation target analysis program 223 requests the LLM 102 to specify the operation target 901. Specifically, for example, the operation target analysis program 223 transmits, to the LLM 102, a question (hereinafter, referred to as a first question 1211) of a fixed sentence in a natural language, such as "what is the operation target 901 of the automation program created as the answer 112? In the automation program created as the answer 112, what command is used for the operation target 901?", as a prompt for specifying the operation target 901.

When the LLM 102 receives the first question, the LLM 102 scans the automation program created as the answer 112, attempts to specify the operation target 901 and the command name 1002, and transmits the operation target 901 and the command name 1002 as a specification result 1212 to the operation target analysis program 223.

(Step S1203: Operation Target Information Search Processing)

When the specification result 1212 (operation target 901 and command name 1002) in step S1202 is received from the LLM 102, the operation target analysis program 223 requests the search for the operation target information 232. Specifically, for example, the operation target analysis program 223 transmits, to the LLM 102, a question (hereinafter referred to as a second question 1221) of a fixed sentence in a natural language such as "whether knows the specified operation target and the data format corresponding to the command?". At this time, the operation target analysis program 223 includes, in the second question 1221, access information designating the computer having the operation target information 232 as a search destination.

When the second question 1221 is received, the LLM 102 accesses its own database to search for the operation target information 232. The LLM 102 searches for the operation target information 232 based on the access information. For example, when the command name 1002 is "aws iam list-users", the LLM 102 extracts the data format 1003 or the data format example 1004 corresponding to the command name 1002 of the specification result 1212 from the own database or the operation target information 232.

For example, when there is the data format example 1004 in the own database or the operation target information 232, the LLM 102 extracts the data format example 1004. When there is no data format example 1004, the LLM 102 extracts the data format 1003. When the data format example 1004 rather than the data format 1003 is used as the prompt 111, answer accuracy of the LLM 102 is improved. The LLM 102 transmits the extracted data format 1003 or the data format example 1004 to the operation target analysis program 223 as a search result 1222.

When the conversion rule 903 of the operation target 901 specified in step S1202 is stored in the own database or in the module table 301, the LLM 102 extracts the conversion rule 903 from the own database or the module table 301. For example, if the operation target 901 specified in step S1202 is "AWS", "community. aws. ec2: module is used, but this is not a correct module name. Correct ec2: is used. A parameter id: is used, but this parameter is not present. When the AMI ID is designated, image: is used.", which is the conversion rule 903 for the module whose module name 902 is "EC2", is extracted.

(Step S1204)

The operation target analysis program 223 determines whether the operation target information 232 is extracted in the search result 1222. When the operation target information 232 is not extracted (step S1204: No), the operation target analysis program 223 transmits, to the chat program 222, an answer 312A indicating that fact as the answer 312. The answer 312A may include the answer content (automation program) of the answer 112. The chat program 222 displays the answer 312A on the output device 207.

When the operation target information 232 is extracted (step S1204: Yes), the processing proceeds to step S1205.

(Step S1205: Operation Target Information Addition Processing)

The operation target analysis program 223 adds the operation target information 232 to the prompt 311 of the re-creation request of the automation program. Specifically, for example, the operation target analysis program 223 adds, to the prompt 311 of the re-creation request, the command name 1002 used in the automation program described in the answer 112 and the output result thereof (the data format 1003 or the data format example 1004), or the conversion rule 903 to the latest module.

(Step S1206: Re-Creation Request Processing)

The operation target analysis program 223 transmits the prompt 311 of the re-creation request in step S1205 to the LLM 102. When the prompt 311 of the re-creation request is received, the LLM 102 generates an answer 312B and transmits the answer 312B as the answer 312 to the chat program 222. The answer 312B includes a code of the re-created automation program. That is, the code of the re-created automation program is generated using the command name 1002 added to the prompt 311 of the re-creation request, the output result (the data format 1003 or the data format example 1004), and the conversion rule 903 to the latest module. The chat program 222 displays the answer 312B on the output device 207.

As described above, according to the operation target analysis program 223, since the data format 1003 or the data format example 1004 and the conversion rule 903 that have not been learned by the LLM 102 are automatically added to the prompt 311, a prompt input load of manpower is reduced, and a correct automation program can be generated in the LLM 102.

<FIG. 13 Operation Target Registration Processing>

FIG. 13 is a flowchart showing an example of operation target registration processing performed by the operation target registration program 224. As a result of executing the creation request processing (step S1201) shown in FIG. 12, the operation target registration processing performed by the operation target registration program 224 is executed, for example, when the answer 312A indicating that the operation target information 232 is not extracted is obtained in the search result 1222.

(Step S1301: First Creation Processing)

When the answer 312A obtained as a result of executing the creation request processing (step S1201) shown in FIG. 12 is received, the operation manager M uses the input device 206 to input, to the prompt content display region 1131, a command used in the automation program and the output result (the data format 1003 or the data format example 1004) acquired by the command.

(Step S1302: Second Creation Processing)

The operation manager M uses the result of step S1301 to input, to the prompt content display region 1131, an automation program in which the module to be used is changed to the latest version, and creates the automation program.

Thereafter, the chat program 222 transmits, to the LLM 102, a prompt in which the conversion rule creation request and the code of the automation program are described, by pressing the transmit button 1130 of the operation manager M. The conversion rule creation request is a creation request of the conversion rule 903. Specifically, for example, the conversion rule creation request includes the operation target 901 and the module name 902 of the latest version module.

When the conversion rule creation request is received, the LLM 102 creates the conversion rule 903 by referring to its own learning content. For example, if the LLM 102 has learned the module name "community. aws. ec2" for the module name 902: EC2 of the operation target 901: AWS, the conversion rule 903 of a natural sentence such as "community. aws. ec2: module is used, but this is not a correct module name. Correct EC2: is used." is created and registered in the module table 301. The LLM 102 transmits the created conversion rule 903 to the chat program 222 as an answer.

In the first creation processing (step S1301) and the second creation processing (step S1302), the prompt and the answer received and transmitted between the chat program 222 and the LLM 102 are stored in the conversation history 233. The conversation history 233 can also refer to the operation target registration program 224.

(Step S1303: Operation Target Specification Processing)

The operation target registration program 224 transmits, to the LLM 102, a prompt for requesting the LLM 102 to specify the operation target 901. Specifically, for example, the prompt is a content that inquires about a series of conversations in the conversation history 233 is what conversation of the operation target 901. When the prompt is received, the LLM 102 generates an answer for specifying the operation target 901 corresponding to the series of conversations in the conversation history 233 and transmits the answer to the operation target registration program 224. The operation target registration program 224 receives the answer from the LLM 102.

(Step S1304: First Registration Processing)

When the answer in step S1303 is received from the LLM 102, the operation target registration program 224 creates a prompt to inquiry the command name 1002 used in the operation target 901 included in the answer and the output result (the data format 1003 or the data format example 1004) according to the command, and transmits the prompt to the LLM 102.

When the prompt is received, the LLM 102 generates an answer including the command name 1002 and the output result (the data format 1003 or the data format example 1004), and transmits the answer to the operation target registration program 224. The operation target registration program 224 registers, in the data format table 302, the command name 1002 which is an answer from the LLM 102 and the output result (the data format 1003 or the data format example 1004) according to the command.

(Step S1303: Operation Target Specification Processing)

The operation manager M checks the output result (the data format 1003 or the data format example 1004) registered in step S1304. Then, the operation target registration program 224 generates a prompt to inquiry a difference between the code of the automation program using the output result (the data format 1003 or the data format example 1004) registered in step S1304 and the code of the automation program using the previous old output result (for example, the code of the automation program obtained in the answer 112 of FIG. 12), and transmits the prompt to the LLM 102.

Specifically, for example, the operation target registration program 224 creates a prompt including the character string 732 in the entry 720 of the conversation history 233 shown in FIG. 7, and transmits the prompt to the LLM 102.

When the prompt is received, the LLM 102 generates, as an answer, a natural sentence indicating a difference (for example, a pair of the codes 714 and 724 shown in FIG. 7) between the new and old automation programs, and transmits the answer to the operation target registration program 224. The operation target registration program 224 registers, in the conversion rule 903 of the data format table 302 in the operation target information 232, the natural sentence (for example, the character string 733) indicating the difference as the answer from the LLM 102.

As described above, according to the operation target registration program 224, since the output result (the data format 1003 or the data format example 1004) and the conversion rule 903 that have not been learned by the LLM 102 are set in the LLM 102, the training accuracy of the LLM 102 is improved, and it is possible to easily generate a correct automation program in the LLM 102. The operation of the operation target 901 and the silo of the maintenance work are prevented.

As described above, according to the embodiment, the automation program can be generated from a manual work procedure by using the generative AI which is a general-purpose model such as the LLM 102, instead of reusing the existing automation program. That is, it is possible to generate a correct automation program by causing the generative AI to learn the operation target information 232.

The invention is not limited to the above embodiments, and includes various modifications and equivalent configurations within the scope of the appended claims. For example, the above embodiment is described in detail for easy understanding of the invention, and the invention is not necessarily limited to those including all the configurations described above. A part of a configuration of one embodiment may be replaced with a configuration of another embodiment. A configuration of one embodiment may also be added to a configuration of another embodiment. Another configuration may be added to a part of a configuration of each embodiment, and a part of the configuration of each embodiment may be deleted or replaced with another configuration.

A part or all of the above configurations, functions, processing units, processing methods, and the like may be implemented by hardware by, for example, designing with an integrated circuit, or may be implemented by software by, for example, a processor interpreting and executing a program for implementing each function.

Information on such as a program, a table, and a file for implementing each function can be stored in a storage device such as a memory, a hard disk, or a solid state drive (SSD), or in a recording medium such as an integrated circuit (IC) card, an SD card, or a digital versatile disc (DVD).

Control lines and information lines considered to be necessary for description are shown, and not all control lines and information lines necessary for implementation are shown. Actually, it may be considered that almost all the configurations are connected to one another.

REFERENCE SIGNS LIST

100: network system
101: creation support device
102: LLM
103: monitoring device
111, 311: prompt
112, 312: answer
201: processor
220: creation support program
221: know-how prompt definition program
222: chat program
223: operation target analysis program
224: operation target registration program
231: know-how prompt information
232: operation target information
233: conversation history
301: analysis module table
302: data format table
901: operation target
902: module name
903: conversion rule
1002: command name
1003: data format
1004: data format example
1211: first question
1212: specification result
1221: second question
1222: search result

The invention claimed is:

1. A creation support device comprising:

a processor configured to execute a program;

a storage device configured to store the program; and a communication interface connected to a network and configured to transmit and receive data to and from a computer trained to generate an answer to an inquiry, wherein the processor executes:

creation request processing of transmitting, to the computer, a creation request of an automation program for automating a work procedure of an operation target, and receiving an answer to the creation request from the computer, specification request processing of transmitting, to the computer, a specification request for specifying the operation target and a command for executing the work procedure from a program code included in the answer to the creation request, and receiving an answer to the specification request from the computer, search request processing of transmitting, to the computer, a search request of an output result of data acquired from the command included in the answer to the specification request, the search request including access information designating operation target information stored in the creation support device as a search destination, and receiving an answer to the search request from the computer, generation processing of generating a re-creation request for re-creating the automation program, the re-creation request including the output result included in the answer to the search request and a conversion rule for converting an old module name of a module used in the operation target to a new module name, and re-creation request processing of transmitting the re-creation request generated by the generation processing to the computer, and receiving an answer to the re-creation request from the computer.

2. The creation support device according to claim 1, wherein in the generation processing, the processor adds, to the re-creation request, a conversion rule from an old module name of a module used in the operation target to a new module name.

3. The creation support device according to claim 1, wherein in the search request processing, the processor transmits, to the computer, the specification request including access information to correspondence information between the command and the output result.

4. The creation support device according to claim 1, wherein in the re-creation request processing, the processor transmits, to the computer, the specification request including access information to a conversion rule from an old module name of a module used in the operation target to a new module name.

5. The creation support device according to claim 1, wherein when the output result is not included in the answer to the search request, the processor executes output processing of outputting an absence answer indicating that the output result is not included in the answer to the search request.

6. The creation support device according to claim 5, wherein the processor executes first setting processing which performs setting such that the computer is accessible to correspondence information between the command and the output result.

7. The creation support device according to claim 5, wherein the processor executes second setting processing which performs setting such that the computer is accessible to a conversion rule from an old module name of a module used in the operation target to a new module name.

8. The creation support device according to claim 1, wherein the operation target information includes a module table and a data format table.

9. The creation support device according to claim 1, wherein in the specification request processing, the processor transmits, to the computer, a first question in a natural language for specifying the operation target and the command used in the automation program created as the answer to the creation request.

10. The creation support device according to claim 1, wherein in the search request processing, the processor transmits, to the computer, a second question in a natural language for inquiring whether the computer knows the specified operation target and a data format corresponding to the command.

11. The creation support device according to claim 1, wherein the output result includes a data format or a data format example, and when the data format example is present in the answer to the search request, the processor uses the data format example in the re-creation request.

12. The creation support device according to claim 1, wherein the processor stores a conversation history in which character strings transmitted and received between the creation support device and the computer are recorded.

13. The creation support device according to claim 1, wherein the operation target is middleware or a cloud service including at least one of a server, a network, a storage, and a database.

14. The creation support device according to claim 1, wherein when the output result is not included in the answer to the search request, the processor outputs an absence answer indicating that the output result is not included in the answer to the search request.

15. The creation support device according to claim 1, wherein the storage device stores know-how prompt information that defines the creation request, the know-how prompt information including a prompt name, a description, a parameter, and fixed information.

16. The creation support device according to claim 1, wherein the automation program is a playbook for automating a procedure of operation work of the operation target.

17. A creation support method executed by a creation support device including a processor configured to execute a program, a storage device configured to store the program, and a communication interface connected to a network and configured to transmit and receive data to and from a computer trained to generate an answer to an inquiry, wherein the processor executes;

creation request processing of transmitting, to the computer, a creation request of an automation program for automating a work procedure of an operation target, and receiving an answer to the creation request from the computer, specification request processing of transmitting, to the computer, a specification request for specifying the operation target and a command for executing the work procedure from a program code included in the answer to the creation request, and receiving an answer to the specification request from the computer, search request processing of transmitting, to the computer, a search request of an output result of data acquired from the command included in the answer to the specification request, the search request including access information designating operation target information stored in the creation support device as a search destination, and receiving an answer to the search request from the computer, generation processing of generating a re-creation request for re-creating the automation program, the re-creation request including the output result included in the answer to the search request and a conversion rule for converting an old module name of a module used in the operation target to a new module name, and re-creation request processing of transmitting the re-creation request generated by the generation processing to the computer, and receiving an answer to the re-creation request from the computer.

18. A creation support program that causes a processor of a creation support device capable of communicating with a computer trained to generate an answer to an inquiry to execute:

creation request processing of transmitting, to the computer, a creation request of an automation program for automating a work procedure of an operation target, and receiving an answer to the creation request from the computer;

specification request processing of transmitting, to the computer, a specification request for specifying the operation target and a command for executing the work procedure from a program code included in the answer to the creation request, and receiving an answer to the specification request from the computer;

search request processing of transmitting, to the computer, a search request of an output result of data acquired from the command included in the answer to the specification request, the search request including access information designating operation target information stored in the creation support device as a search destination, and receiving an answer to the search request from the computer;

generation processing of generating a re-creation request for re-creating the automation program, the re-creation request including the output result included in the answer to the search request and a conversion rule for converting an old module name of a module used in the operation target to a new module name; and re-creation request processing of transmitting the re-creation request generated by the generation processing to the computer, and receiving an answer to the re-creation request from the computer.

19. The creation support device according to claim 8, wherein the data format table includes the operation target, a command name, a data format, and a data format example as fields.

20. The creation support device according to claim 8, wherein the module table includes the operation target, a module name, and the conversion rule as fields.

* * * * *